UNITED STATES PATENT OFFICE.

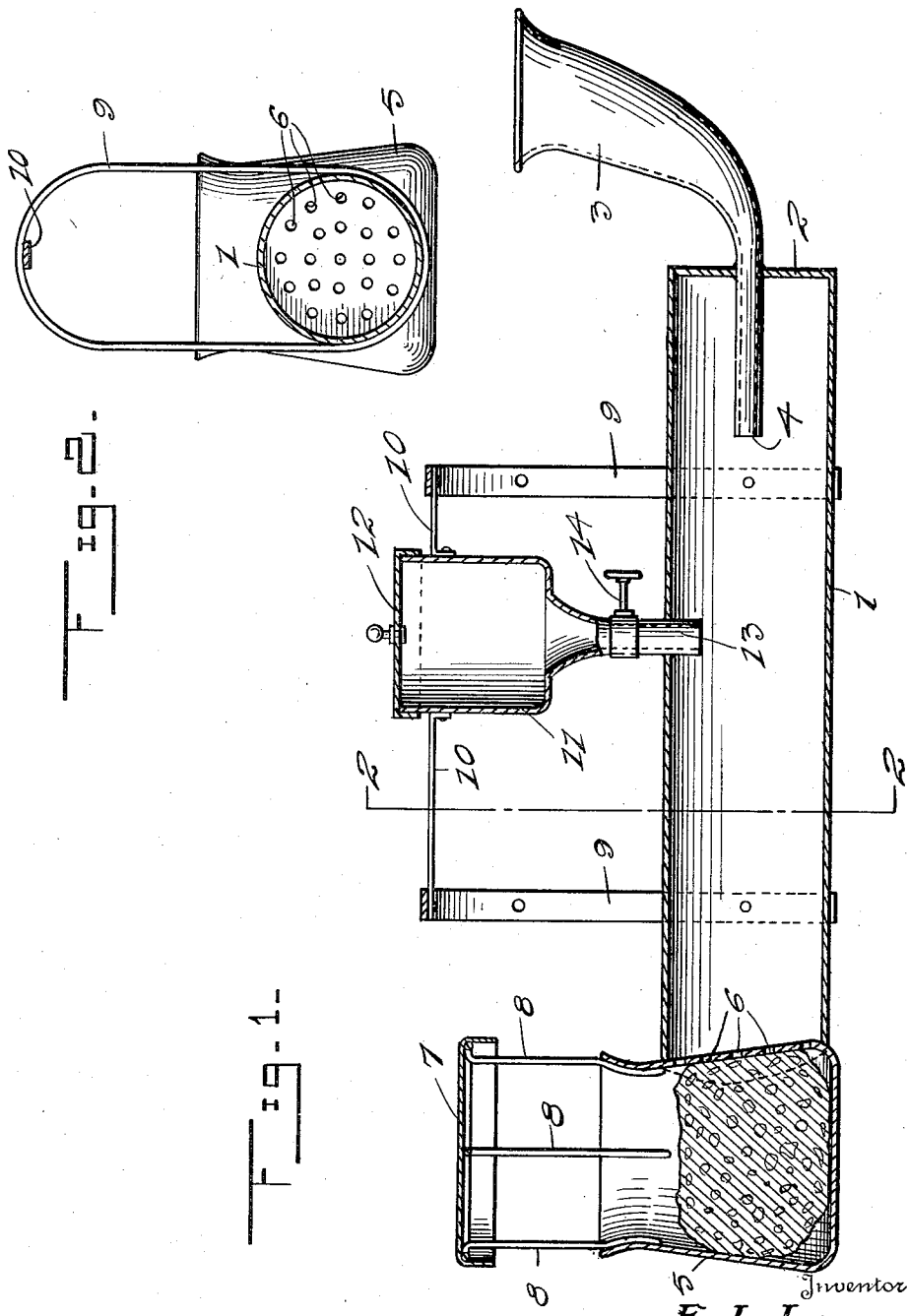

EMMA L. LEE, OF CHICAGO, ILLINOIS.

FLY-EXTERMINATOR.

1,153,123. Specification of Letters Patent. Patented Sept. 7, 1915.

Application filed May 7, 1915. Serial No. 26,598.

*To all whom it may concern:*

Be it known that I, EMMA L. LEE, a citizen of the United States, residing at Chicago, in the county of Cook and State of Illinois, have invented certain new and useful Improvements in Fly-Exterminators; and I do hereby declare the following to be a full, clear, and exact description of the invention, such as will enable others skilled in the art to which it appertains to make and use the same.

This invention relates to fly exterminators, the principal object of which is to provide a device of simple construction for holding a container or receptacle for a poisonous sweetened liquid which will be attractive to flies and which will quickly kill the flies after they have tasted of the liquid.

The foregoing and other objects may be attained by means of the construction illustrated in the accompanying drawing, in which—

Figure 1 is a central longitudinal sectional view of a fly exterminator made in accordance with this invention, and Fig. 2 is a vertical sectional view taken on the line 2—2 of Fig. 1, looking in the direction indicated by the arrow.

Referring to the drawing, the numeral 1 designates a hollow casing or cylinder having a head 2 at one end, and a filling funnel 3 extending through the head and having a discharge opening 4 within the casing. At the opposite end of the casing or cylinder is a container 5, said container having a series of perforations 6 communicating with the cylinder 1. Mounted adjustably upon the container 5, is a canopy or cover 7, said cover having a series of resilient wire supports 8, said supports adapted to be adjusted within the container 5 to hold the canopy 7 at the required distance from the upper edge thereof, and to also permit the canopy 7 to serve as a cover when pushed down upon the top of the container 5. Bails or straps 9 are connected to the casing 1, and extend some distance above the same, as shown in Fig. 2, and supported upon the braces 10 which are connected to the bails 9 is a receiver 11, said receiver having a removable cover 12 and a discharge nozzle 13 extending into the top of the casing 1. Said receiver is provided with a suitable valve 14. In use, the receiver 11 contains a quantity of arsenic or other poisonous liquid which will readily mix with sweetened water and be attractive to flies. A sponge or other absorbent material may be placed in the container 5, and a quantity of sweetened water is poured into the funnel 3, after which the valve 14 may be opened to permit a sufficient quantity of the poisonous liquid to be mixed with the sweetened water. This water passes through the perforations 6, and is taken up by the sponge in the container 5. The entire device is adapted to be suspended from a comparatively high place in a barn, stable, house or other place where flies are plentiful, and owing to the attractiveness of the sweetened liquid, flies will gather about the apparatus and sip the poisonous liquid and die almost immediately. The receptacle may contain arsenic powder and sugar, thus permitting the use of clear water in the receptacle or cylinder 1.

Various changes may be made in the details of construction without departing from the spirit and scope of the invention as defined in the claims.

What is claimed is:—

1. A fly exterminator comprising a casing, a container having a series of perforations therein and connected to the casing, an adjustable canopy top for said container, means for filling the casing with a sweetened liquid, and a receiver communicating with the top of the casing for containing a poisonous compound.

2. A fly exterminator comprising a hollow casing, a funnel fitted in one end of said casing, a container connected to the opposite end of said casing and provided with perforations to communicate with said casing, a receiver mounted in the top of the casing for containing a poisonous compound, and a valve in said receiver.

3. A fly exterminator comprising a casing, a container connected to the casing and communicating therewith, and a poison receiver communicating with the upper portion of the casing, and means for feeding sweetened water into the casing.

In testimony whereof I affix my signature in presence of two witnesses.

EMMA L. LEE.

Witnesses:
NELLIE JOHNSON,
THOWALD JOHNSON.

Copies of this patent may be obtained for five cents each, by addressing the "Commissioner of Patents, Washington, D. C."